US012142817B2

(12) United States Patent
Oh et al.

(10) Patent No.: US 12,142,817 B2
(45) Date of Patent: Nov. 12, 2024

(54) ANTENNA UNIT AND A DISPLAY DEVICE INCLUDING A DIELECTRIC LAYER

(71) Applicant: DONGWOO FINE-CHEM CO., LTD., Jeollabuk-do (KR)

(72) Inventors: Yun Seok Oh, Gyeonggi-do (KR); Han Sub Ryu, Gyeongsangbuk-do (KR); Won Hee Lee, Incheon (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 310 days.

(21) Appl. No.: 17/690,448

(22) Filed: Mar. 9, 2022

(65) Prior Publication Data

US 2022/0200132 A1 Jun. 23, 2022

Related U.S. Application Data

(63) Continuation of application No. PCT/KR2020/012314, filed on Sep. 11, 2020.

(30) Foreign Application Priority Data

Sep. 11, 2019 (KR) ........................ 10-2019-0112964
Mar. 3, 2020 (KR) ........................ 10-2020-0026811

(51) Int. Cl.
*H01Q 1/24* (2006.01)

(52) U.S. Cl.
CPC .................................... *H01Q 1/241* (2013.01)

(58) Field of Classification Search
CPC .......... H01Q 1/241; H01Q 1/38; H01Q 1/243; H01Q 21/08; H01Q 9/0407; H01Q 1/24; H01Q 9/04; H01Q 23/00; H01Q 13/08; H01Q 1/08; H01Q 1/48; H01Q 1/42; H01Q 1/44; H01Q 1/27; H01Q 1/422; H01Q 1/526; H01Q 3/12; H01Q 9/0485; H01Q 9/065; H01Q 19/185; H04W 88/02;

(Continued)

(56) References Cited

U.S. PATENT DOCUMENTS 8,896,487 B2 * 11/2014 Chiang et al. ......... H01Q 13/18
10,418,687 B2 * 9/2019 Mow et al. ............ H01Q 1/243
2012/0062439 A1 * 3/2012 Liao et al. .................... 343/841

(Continued)

FOREIGN PATENT DOCUMENTS

JP 2006-222528 A 8/2006
JP 2016-116231 A 6/2016

(Continued)

OTHER PUBLICATIONS (CN 1778017 B) Antenna Device (see title and Description) (Year: 2011).*

(Continued)

*Primary Examiner* — Meless N Zewdu
(74) *Attorney, Agent, or Firm* — The PL Law Group, PLLC

(57) ABSTRACT

An antenna device according to an embodiment of the present invention includes a dielectric layer, and an antenna unit disposed on at least two of an upper surface, a side surface and a lower surface of the dielectric layer to have a bent structure. The antenna device is disposed at a side surface of a display device using the bent structure so that radiation and signaling reliability are improved while reducing a signal loss.

17 Claims, 10 Drawing Sheets

(58) Field of Classification Search
CPC ...... G01S 5/02695; G01S 7/027; G01S 7/028; H04B 5/43; H04B 7/0469
See application file for complete search history.

(56) References Cited

U.S. PATENT DOCUMENTS

| | | | | |
|---|---|---|---|---|
| 2012/0111950 | A1* | 5/2012 | Worrall et al. | 235/488 |
| 2013/0292808 | A1* | 11/2013 | Yen et al. | 257/660 |
| 2017/0139520 | A1* | 5/2017 | Yeh et al. | G06F 3/0416 |
| 2018/0115053 | A1* | 4/2018 | Hu et al. | H01Q 1/243 |
| 2019/0089052 | A1* | 3/2019 | Yong et al. | H01Q 3/34 |
| 2019/0267718 | A1* | 8/2019 | Rajagopalan et al. | H01Q 21/065 |
| 2019/0319367 | A1* | 10/2019 | Edwards et al. | H01Q 21/22 |
| 2020/0227821 | A1* | 7/2020 | Wu et al. | H01Q 1/526 |
| 2020/0312971 | A1* | 10/2020 | Penumatcha et al. | H04L 29/42364 |
| 2022/0278445 | A1* | 9/2022 | Woo | H01Q 1/36 |

FOREIGN PATENT DOCUMENTS

| | | | |
|---|---|---|---|
| JP | 2019-004241 | A | 1/2019 |
| KR | 10-2015-0017552 | A | 2/2015 |
| KR | 10-2016-0059291 | A | 5/2016 |
| KR | 10-2016-0080444 | A | 7/2016 |

OTHER PUBLICATIONS (CN 101958456 B) Cavity Antenna for an Electronic Device (see title) (Year: 2016).*
(CN 111244600 A) Antenna Structure and Wireless Communication Device With the Antenna Structure (see title) (Year: 2020).*
(KR 101940798 B1) Film Antenna and Display Device Including the Same (see title) (Year: 2019).*
(KR 20140100055 A) >>> Bulk Type Ceramic Chip Antenna (see title). (Year: 2014).*
(JP 2005323368 A) >> the thin layer is provided on a substrate layer, for example a layer formed of a dielectric material, and the at least part of the antenna is disposed on the surface of this substrate layer; The thin layer is folded across the substrate layer so that the—(title and Description) (Year: 2005).*
(WO 2005101574 A1) >> Miniature Antenna (see title and abstract; pars. 0012-0013) (Year: 2005).*
(CN 104112910 A) >>> dielectric layer 11 of the dielectric substrate 10 is made of a suitable rigid and bending processing of a resin component forming. (see title and par. 0062). (Year: 2014).*
International Search Report for PCT/KR2020/012314 mailed on Dec. 24, 2020.

* cited by examiner

ANTENNA UNIT AND A DISPLAY DEVICE INCLUDING A DIELECTRIC LAYER

CROSS-REFERENCE TO RELATED APPLICATION

The present application is a continuation application to International Application No. PCT/KR2020/012314 with an International Filing Date of Sep. 11, 2020, which claims the benefit of Korean Patent Application No. 10-2019-0112964 filed on Sep. 11, 2019 and Korean Patent Application No. 10-2020-0026811 filed on Mar. 3, 2020 at the Korean Intellectual Property Office, the disclosures of which are incorporated by reference herein in their entirety.

BACKGROUND

1. Technical Field

The present invention relates to an antenna device and a display device including the same. More particularly, the present invention relates to an antenna device including a dielectric layer and an antenna unit, and a display device including the same.

2. Background Art

As information technologies have been developed, a wireless communication technology such as Wi-Fi, Bluetooth, etc., is combined with a display device in, e.g., a smartphone form. In this case, an antenna may be combined with the display device to provide a communication function.

As mobile communication technologies have been rapidly developed, an antenna capable of operating a high frequency or ultra-high frequency communication is needed in the display device. Further, as the display device equipped with the antenna becomes thinner and light-weighted, a space for the antenna may be also decreased. Accordingly, a high frequency and broadband signal transmission/reception may not be easily implemented in a limited space.

Thus, the antenna may be applied to the display device in a film shape or a patch shape, and an antenna construction for achieving reliability of radiation properties is required even in a thin structure.

For example, Korean Published Patent Application No. 2016-0059291 discloses an antenna integrated to a display panel, which may not provide sufficient radiation reliability for a high-frequency band communication in a limited space.

SUMMARY

According to an aspect of the present invention, there is provided an antenna device having improved signaling efficiency and radiation property.

According to an aspect of the present invention, there is provided a display device including an antenna device with improved signaling efficiency and radiation property.

(1) An antenna device, including: a dielectric layer; and an antenna unit disposed on at least two of an upper surface, a side surface and a lower surface of the dielectric layer to have a bent structure.

(2) The antenna device of the above (1), wherein the side surface of the dielectric layer has a curved surface.

(3) The antenna device of the above (1), wherein the antenna unit includes a radiator, a transmission line branched from and connected to the radiator, and a signal pad connected to an end portion of the transmission line.

(4) The antenna device of the above (3), wherein the radiator is disposed on the upper surface of the dielectric layer, the transmission line is disposed on the side surface of the dielectric layer, and the signal pad is disposed on the lower surface of the dielectric layer.

(5) The antenna device of the above (3), wherein the radiator and the transmission line are disposed on the upper surface of the dielectric layer, and the signal pad is disposed on the side surface and the lower surface of the dielectric layer.

(6) The antenna device of the above (3), wherein the radiator and the transmission line are disposed on the side surface of the dielectric layer.

(7) The antenna device of the above (6), further including a ground pattern disposed at an inside of the dielectric layer to face the radiator with the dielectric layer therebetween.

(8) The antenna device of the above (6), wherein the signal pad is disposed on the lower surface of the dielectric layer.

(9) The antenna device of the above (6), wherein a portion of the signal pad is disposed on the side surface of the dielectric layer, and a remaining portion of the signal pad is disposed on the lower surface of the dielectric layer.

(10) The antenna device of the above (3), further including a ground pad spaced apart from the transmission and disposed around the signal pad.

(11) The antenna device of the above (1), wherein the dielectric layer is formed by folding a preliminary dielectric layer in a planar state which includes a first region, a second region and a third region, and the second region is folded so that the first region and the third region face each other, and a surface of the second region of the preliminary dielectric layer corresponds to the side surface of the dielectric layer.

(12) The antenna device of the above (11), wherein the first region of the dielectric layer is disposed on an electrode structure included in a display panel, and the electrode structure serves as a ground layer of the antenna unit.

(13) The antenna device of the above (12), wherein the second region of the dielectric layer is folded along a side surface of the display panel.

(14) The antenna device of the above (13), wherein the third region of the dielectric layer is disposed under the display panel.

(15) The antenna device of the above (3), wherein the radiator has a mesh structure.

(16) The antenna device of the above (15), further including a dummy mesh pattern arranged around the radiator and spaced apart from the radiator.

(17) A display device including the antenna device according to embodiments as described above.

An antenna device according to embodiments of the present invention may include a dielectric layer and an antenna unit being disposed over upper, side and/or lower surfaces of the dielectric layer and having a bent structure. Accordingly, the antenna device may be disposed on a side of the display device, and high frequency/ultra-high frequency and broadband signal transmission and reception may be implemented in a limited space.

In some embodiments, a radiator of the antenna unit may be disposed on the upper surface or the side surface of the dielectric layer, and a signal pad may be disposed on the lower surface of the dielectric layer. Accordingly, transmission and reception at desired frequency may be realized while reducing a size of a bezel area of an image display device to which the antenna unit is applied.

In some embodiments, the antenna unit may be disposed on a display panel. For example, the antenna unit may be folded and disposed along a side surface of the display panel. Accordingly, a conductive member included in the display panel may be used as a ground layer of the antenna unit without the formation of an individual ground layer.

The antenna unit may include a mesh structure, and a dummy mesh pattern may be arranged around the antenna unit. Accordingly, a visual recognition of electrodes due to the difference in pattern shapes may be prevented and deterioration of an image quality of the display device on which the antenna device is disposed.

The antenna device may be applied to a display device including a mobile communication device capable of transmitting and receiving signals in 3G, 4G, 5G or higher of high-frequency or ultra-high frequency bands to improve optical properties and radiation properties such as transmittance.

DETAILED DESCRIPTION OF THE EMBODIMENTS

According to exemplary embodiments of the present invention, there is provided an antenna device that includes a dielectric layer and an antenna unit being disposed on at least two of upper, side and/or lower surfaces of the dielectric layer and having a bent structure.

The antenna device may be, e.g., a microstrip patch antenna fabricated in the form of a transparent film. The antenna device may be applied to communication devices for a mobile communication of a high or ultrahigh frequency band (e.g., 3G, 4G, 5G or more). However, an application of the antenna device is not limited to a display device, and the antenna device may be applied to various objects or structures such as a vehicle, a home electronic appliance, an architecture, etc.

According to exemplary embodiments of the present invention, there is also provided a display device including the antenna device.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
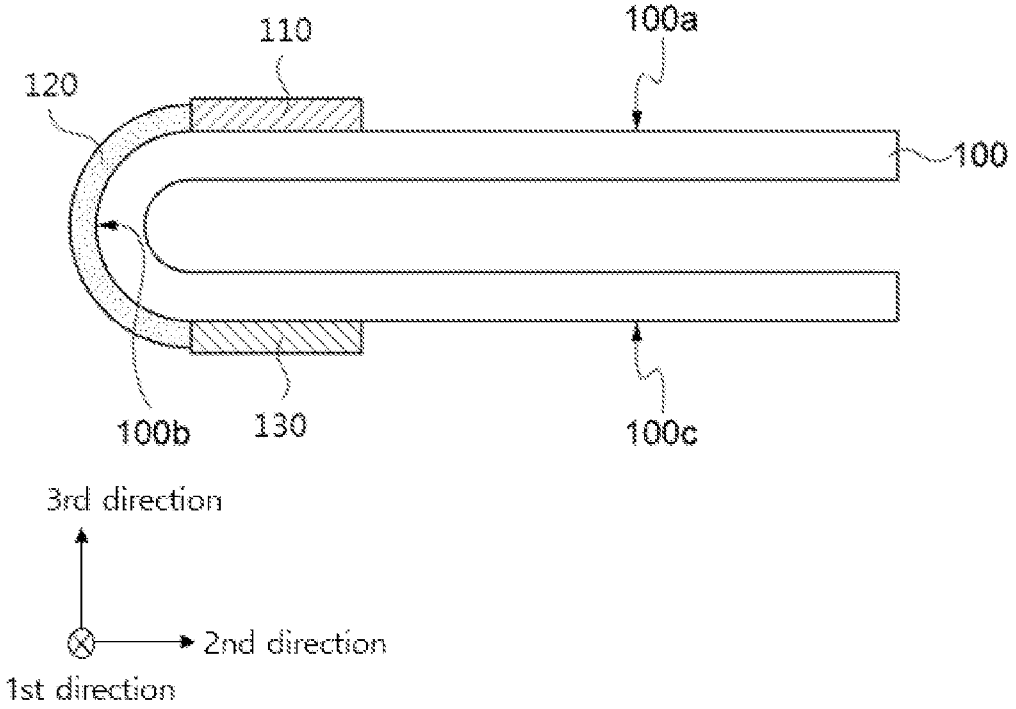
FIG. 1 is a cross-sectional view illustrating an antenna device in accordance with exemplary embodiments.
Figure 2:
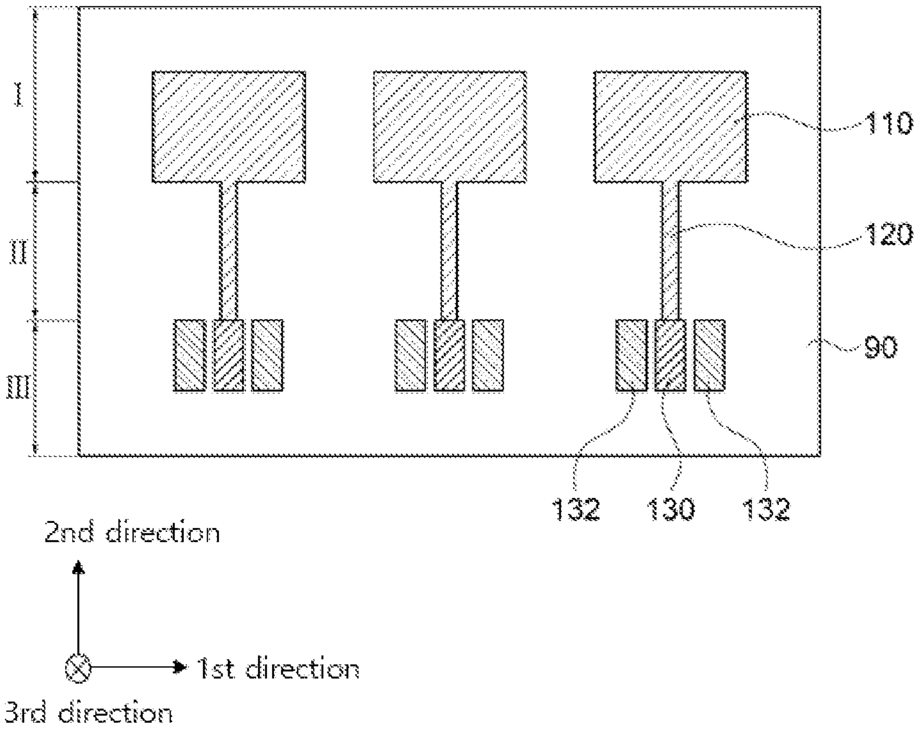
FIG. 2 is a cross-sectional view illustrating an antenna device in a planar state before being bent in accordance with exemplary embodiments.

FIG. 1 is a cross-sectional view illustrating an antenna device in accordance with exemplary embodiments. FIG. 2 is a cross-sectional view illustrating an antenna device in a planar state before being bent in accordance with exemplary embodiments.

In FIG. 1, two directions being parallel to a top surface of a dielectric layer 100 and intersecting each other are defined as a first direction and a second direction. For example, the first direction and the second direction may be perpendicular to each other. A direction vertical to the top surface of the dielectric layer 100 is defined as a third direction. For example, the first direction may correspond to a width direction of the antenna device, the second direction may correspond to a length direction of the antenna device, and the third direction may correspond to a thickness direction of the antenna device. The definitions of the directions may be the same in all accompanying drawings.

Referring to FIG. 1, the antenna device according to exemplary embodiments may include the dielectric layer 100 and an antenna unit having a bent structure on a surface of the dielectric layer 100.

The dielectric layer 100 may include a first surface 100*a*, a second surface 100*b*, and a third surface 100*c*. For example, the first surface 100*a*, the second surface 100*b*, and the third surface 100*c* may correspond to an upper surface, a side surface, and a lower surface of the dielectric layer 100, respectively.

In some embodiments, the second surface 100*b* of the dielectric layer 100 may have a substantially curved shape. For example, a perimeter of the second surface 100*b* of the dielectric layer 100 may have a substantially curved profile such as a semicircular shape.

The dielectric layer 100 may include an insulating material having a predetermined dielectric constant. For example, the dielectric layer 100 may include a transparent resin material having flexible and foldable properties. Accordingly, as will be described later with reference to FIG. 2, the dielectric layer 100 including a curved surface may be easily implemented by bending a preliminary dielectric layer 90.

For example, the dielectric layer 100 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth) acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyether-sulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more therefrom.

In some embodiments, an adhesive film such as an optically clear adhesive (OCA), an optically clear resin (OCR), or the like may be included in the dielectric layer 100.

In some embodiments, the dielectric layer 100 may include an inorganic insulating material such as silicon oxide, silicon nitride, silicon oxynitride, glass, etc.

In some embodiments, a dielectric constant of the dielectric layer 100 may be adjusted in a range from about 1.5 to about 12. When the dielectric constant exceeds about 12, a signal loss through a transmission line 120 may be excessively increased to degrade signal sensitivity and efficiency in a high frequency band communication.

The antenna unit may include a radiator 110, the transmission line 120 and a signal pad 130. In exemplary embodiments, the radiator 110 may be disposed on the first surface 100*a* of the dielectric layer 100, the transmission line 120 may be disposed on the second surface 100*b* of the dielectric layer 100, and the signal pad 130 may be disposed on the third surface 100*c* of the dielectric layer 100.

The radiator 110 may have, e.g., a polygonal plate shape as illustrated in FIG. 2. A shape of the radiator 110 illustrated in FIG. 2 is one example and may be appropriately changed in consideration of a radiation efficiency, or the like.

The transmission line 120 may be branched from one side of the radiator 110 and extend along a profile of the second surface 100*b* of the dielectric layer 100. The signal pad 130 may be connected to a terminal end portion of the transmission line 120 and may extend on the third surface 100*c* of the dielectric layer 100.

The antenna unit may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in a combination of at least two therefrom.

For example, the antenna unit may include silver (Ag) or a silver alloy to reduce a resistance, and may include, e.g., a silver-palladium-copper (APC) alloy.

In an embodiment, the antenna unit may include copper (Cu) or a copper alloy (e.g., a copper-calcium (CuCa)) to implement a low resistance and a fine line width patterning.

In some embodiments, the antenna unit may include a transparent conductive oxide such as indium tin oxide (ITO), indium zinc oxide (IZO), indium zinc tin oxide (ITZO), zinc oxide (ZnOx), or the like.

In some embodiments, the antenna unit may have a double-layered structure of a transparent conductive oxide layer and a metal layer, or a triple-layered structure of a transparent conductive oxide layer, a metal layer and a transparent conductive oxide layer. In this case, flexible property may be improved by the metal layer while reducing a resistance. Corrosive resistance and transparency may be improved by the transparent conductive oxide layer.

The antenna device may be formed by forming the antenna unit on the preliminary dielectric layer 90 and then bending the preliminary dielectric layer 90. The preliminary dielectric layer 90 may refer to a dielectric layer in a planar state before being bent as illustrated in FIG. 1.

Referring to FIG. 2, the preliminary dielectric layer 90 may include a first region I, a second region II and a third region III. The radiator 110, the transmission line 120 and the signal pad 130 may be disposed on the first region I, the second region II and the third region III of the preliminary dielectric layer 90, respectively.

The antenna unit may be formed on the preliminary dielectric layer 90, and then the preliminary dielectric layer 90 may be folded such that the first region I and the third region III may face each other by the second region II. For example, the second region II may be bent to substantially fold the preliminary dielectric layer.

In this case, the first region I and the third region III may overlap each other in the third direction. Accordingly, after being bent, the first region (I) and the third region (III) may be provided as upper and lower portions of the dielectric layer 100, respectively, and a surface of the second region (II) may correspond to the second surface 100*b* of the dielectric layer 100.

The antenna unit may further include a ground pad 132 spaced apart from the transmission line 120 and the signal pad 130 around the signal pad 130. Accordingly, noises generated during transmission and reception of a radiation signal through the signal pad 130 may be efficiently filtered or reduced.

For example, a pair of the ground pads 132 may be disposed to face each other with the signal pad 130 interposed therebetween. In this case, the antenna unit may also provide a horizontal radiation property.

As described above, as the second region II may be bent, the ground pads 132 may be disposed on the third surface 100*c* of the dielectric layer 100 together with the signal pad 130. Accordingly, the ground pad 132 may overlap the radiator 110 in the third direction.

In this case, the ground pad 132 may also serve as the ground layer for the radiator 110, and a vertical radiation may be implemented through the radiator 110.

In some embodiments, an additional ground layer may be formed under the first radiator 110, and a conductive member of a display device to which the antenna element is applied may serve as the ground layer for the radiator 110.

The conductive member may include, e.g., a gate electrode of a thin film transistor (TFT), various wirings such as a scan line and a data line, or various electrodes such as a pixel electrode and a common electrode included in a display panel.

In an embodiment, for example, various structures including a conductive material disposed under the display panel may serve as the ground layer. For example, a metal plate (e.g., a stainless-steel plate such as a SUS plate), a pressure sensor, a fingerprint sensor, an electromagnetic wave shielding layer, a heat dissipation sheet, a digitizer, etc., may serve as the ground layer.

As illustrated in FIG. 2, a plurality of the antenna units may be disposed in an array form along, e.g., the first direction. In an embodiment, the antenna units may have the same shape or size and may have the same resonance frequency.

In an embodiment, the plurality of the antenna units may include antenna units having sensitivities to different frequencies, and may have different shapes or sizes. Accordingly, frequency coverage and gain property of the antenna device may be increased.

According to the above-described exemplary embodiments, the antenna unit may be designed 3-dimensionally by utilizing the first surface 100*a*, the second surface 100*b* and the third surface 100*c* of the dielectric layer 100. Accordingly, an area occupied by the antenna unit may be reduced, and, for example, a bezel area of the image display device to which the antenna device is applied may be reduced.

The signal pad 130 may be electrically connected to an antenna driving integrated circuit (IC) chip through a conductive connection member such as a flexible printed circuit board (FPCB). The signal pad 130 may be disposed under the radiator 110 on the third surface 100*c* of the dielectric layer 100, so that a space into which the conductive connecting member may be inserted may be additionally achieved.

In an embodiment, the signal pad 130 may be directly connected or bonded to a pad of the antenna driving IC chip on the third surface 100*c* of the dielectric layer 100 without using the conductive connection member.

In an embodiment, the antenna device may further include the flexible circuit board (FPCB). The antenna device may further include a driving integrated circuit (IC) chip electrically connected to the antenna through the flexible circuit board (FPCB).

In an embodiment, the direct drive integrated circuit (IC) chip may be directly disposed on the flexible circuit board (FPCB). For example, a circuit or a contact electrically connecting the driving integrated circuit (IC) chip and a feeding line may be formed in the flexible circuit board (FPCB). The flexible circuit board (FPCB) and the driving integrated circuit (IC) chip may be adjacent to each other, so that a signal transmission/reception path may be shortened to suppress a signal loss.

In an embodiment, an intermediate circuit board such as a rigid printed circuit board (Rigid-PCB) may be further disposed between the flexible circuit board and the driving IC chip.

Figure 3:
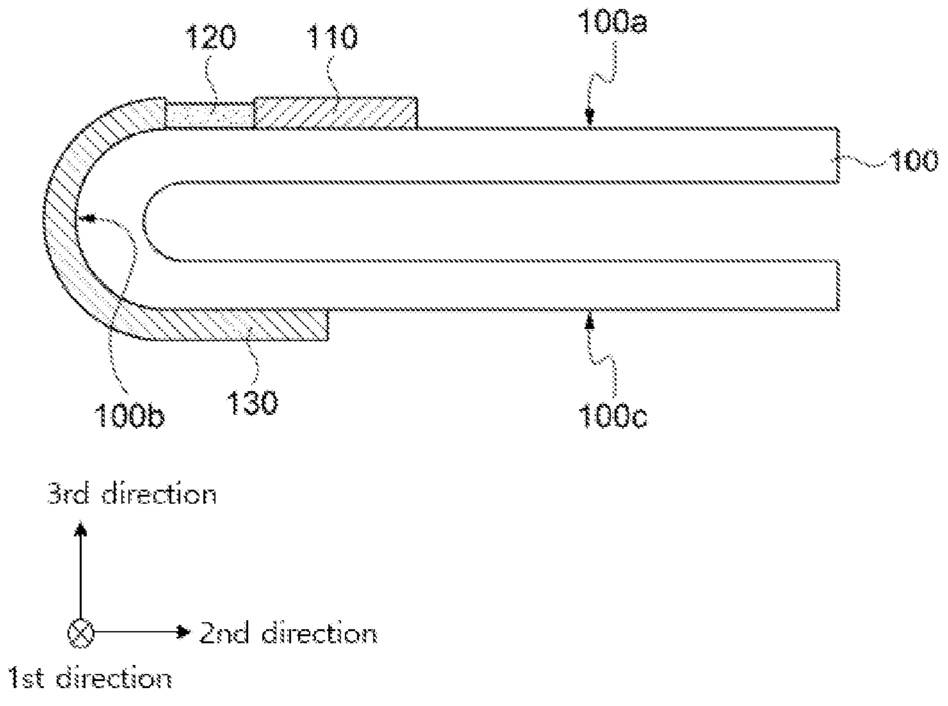
FIG. 3 is a cross-sectional view illustrating an antenna device in accordance with some exemplary embodiments.
Figure 4:
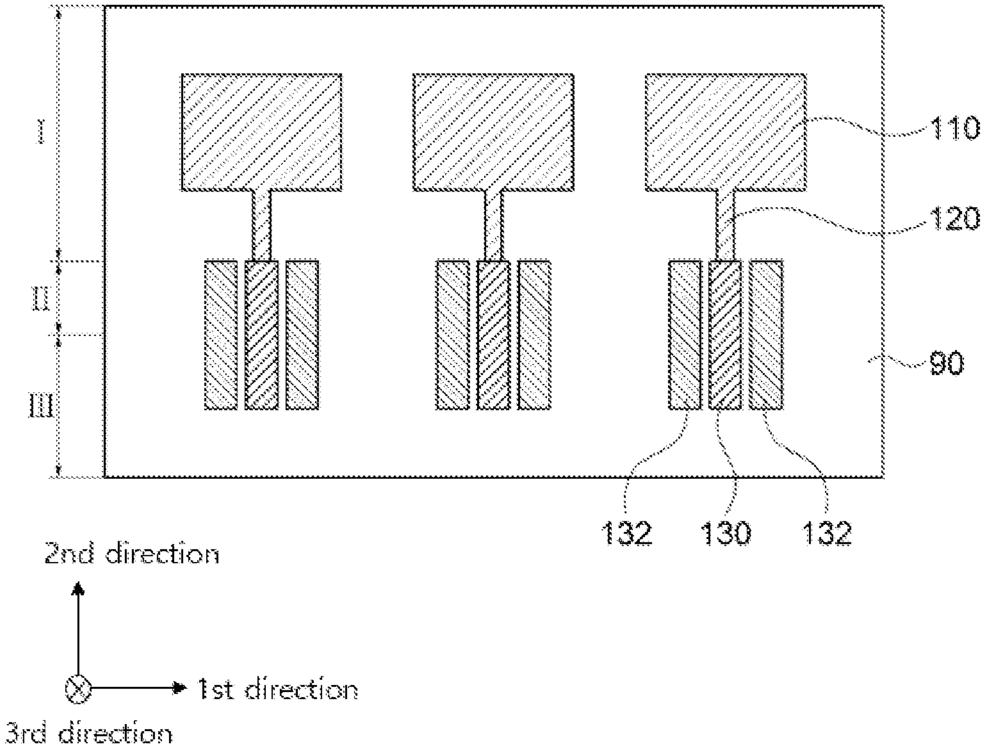
FIG. 4 is a cross-sectional view illustrating an antenna device in a planar state before being bent in accordance with some exemplary embodiments.

FIG. 3 is a cross-sectional view illustrating an antenna device in accordance with some exemplary embodiments. FIG. 4 is a cross-sectional view illustrating an antenna device in a planar state before being bent in accordance with some exemplary embodiments. Detailed descriptions of elements and structures substantially the same as or similar to those described with reference to FIGS. 1 and 2 are omitted herein.

Referring to FIG. 3, the antenna device according to some exemplary embodiments may include the dielectric layer 100, the radiator 110 and the transmission line 120 disposed on the first surface 100*a* of the dielectric layer, and the signal pad 130 disposed continuously on the second surface 100*b* and the third surface 100*c* of the dielectric layer. Thus, a distance between the radiator 110 and the signal pad 130 may be reduced and the signal transmission/reception path may be shortened, thereby preventing an increase of resistance or signal loss through the transmission line 120.

Referring to FIG. 4, the radiator 110 and the transmission line 120 may be formed on the first region I of the preliminary dielectric layer 90, and the signal pad 130 may be formed on the second region II and the third region III.

After the formation of the antenna unit on the preliminary dielectric layer 90, the preliminary dielectric layer 90 may be folded such that the first region I and the third region III face each other via the second region II. Accordingly, as illustrated in FIG. 3, the radiator 110 and the transmission line 120 may be disposed on the first surface 100*a* of the dielectric layer 100, and the signal pad 130 may be disposed commonly on the second surface 100*b* and the third surface 100*c* of the dielectric layer 100.

Figure 5:
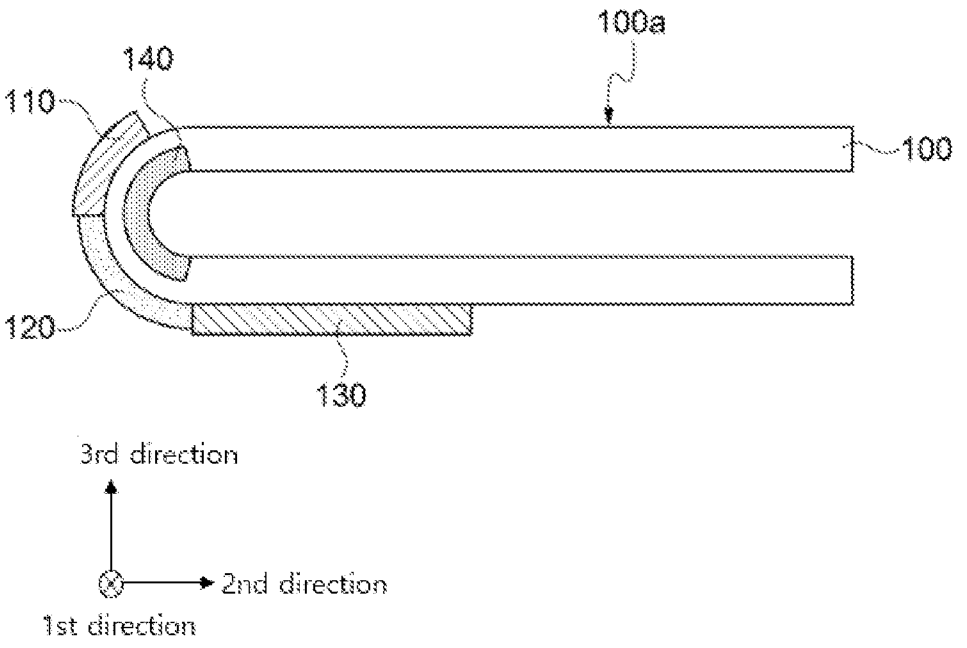
FIG. 5 is a cross-sectional view illustrating an antenna device in accordance with some exemplary embodiments.
Figure 6:
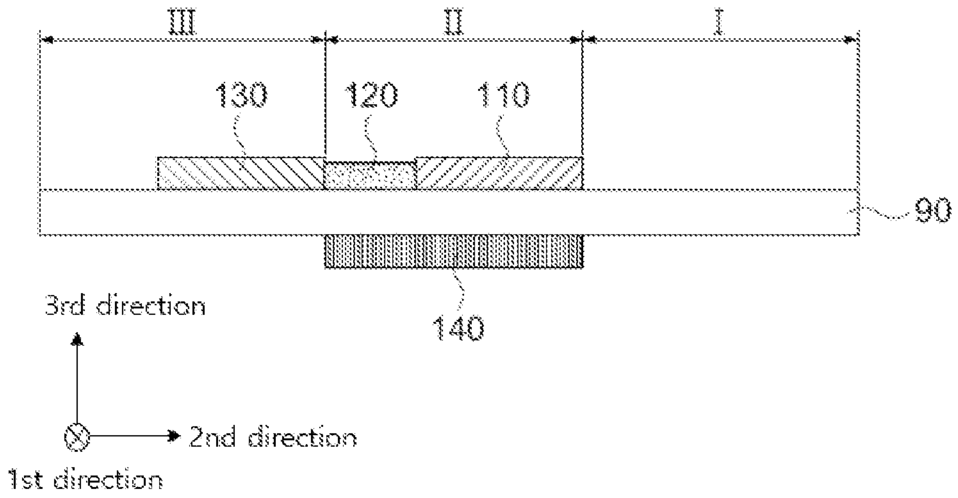
FIG. 6 is a cross-sectional view illustrating an antenna device in a planar state before being bent in accordance with some exemplary embodiments.

FIG. 5 is a cross-sectional view illustrating an antenna device in accordance with some exemplary embodiments. FIG. 6 is a cross-sectional view illustrating an antenna device in a planar state before being bent in accordance with some exemplary embodiments. Detailed descriptions of structures and elements substantially the same as or similar to those described with reference to FIGS. 1 and 2 are omitted herein.

Referring to FIG. 5, the antenna device according to some exemplary embodiments may include the dielectric layer 100, the radiator 110 and the transmission line 120 disposed on the second surface 100*b* of the dielectric layer, and the signal pad 130 disposed on the third surface 100*c* of the dielectric layer.

In exemplary embodiments, the antenna device may further include a ground pattern 140 which may be disposed at an inside of the dielectric layer 100 or buried in the dielectric layer 100 to face the radiator 110 in the second direction with the dielectric layer 100 interposed therebetween.

A side radiation through the second surface 100*b* of the dielectric layer 100 may be implemented.

For example, a distance between the antenna unit and the ground pattern 140 may be from 40 to 1000 μm. In this case, resonance frequency properties corresponding to high frequency/ultra-high frequency bands of 3G, 4G, 5G or higher may be easily implemented.

Referring to FIG. 6, the antenna unit may be formed on an upper surface of the preliminary dielectric layer 90, and the ground pattern 140 may be formed on a lower surface of the preliminary dielectric layer 90.

For example, the radiator 110 and the transmission line 120 may be formed on a portion of the upper surface in the second region II of the preliminary dielectric layer 90, and the signal pad 130 may be formed on a portion of the upper surface in the third region III of the preliminary dielectric layer 90. The ground pattern 140 may be formed on a portion of the lower surface in the second region II of the preliminary dielectric layer 90.

The preliminary dielectric layer 90 on which the antenna unit and the ground pattern 140 are formed may be bent using the second region II so that the ground pattern 140 may be inserted into the dielectric layer 100. Accordingly, the ground pattern 140 may be disposed in a bent inner portion of the dielectric layer 100 and may be substantially surrounded by the first region I and the third region III of the dielectric layer 100.

In an embodiment, the ground pattern 140 may have a structure substantially buried in the dielectric layer 100 as illustrated in FIG. 5.

As illustrated in FIG. 5, the radiator 110 and the ground pattern 140 may have a curved pattern shape such as a C-shape. Accordingly, a radiation direction may be expanded to increase a radiation coverage.

Figure 7:
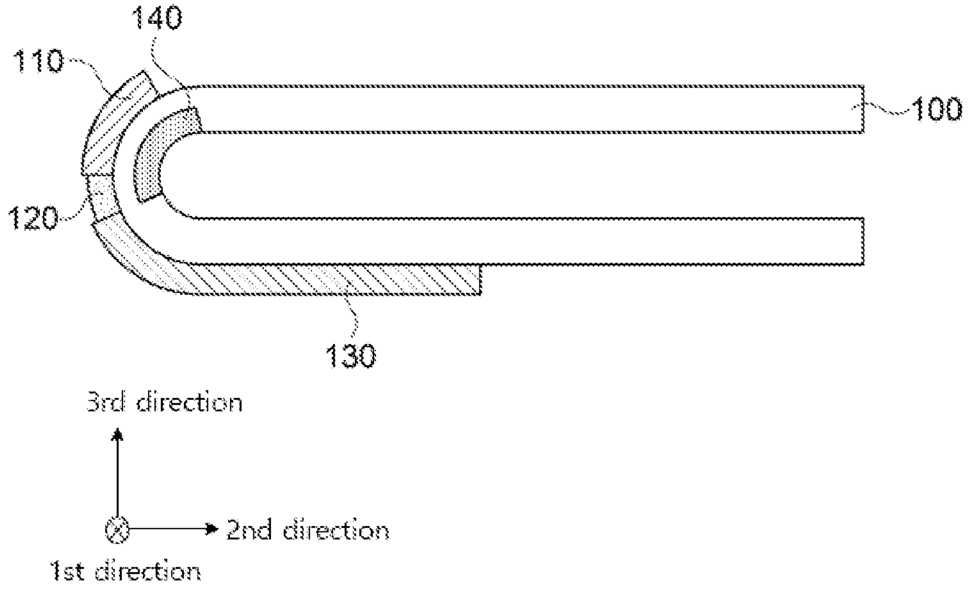
FIG. 7 is a cross-sectional view illustrating an antenna device in accordance with some exemplary embodiments.
Figure 8:
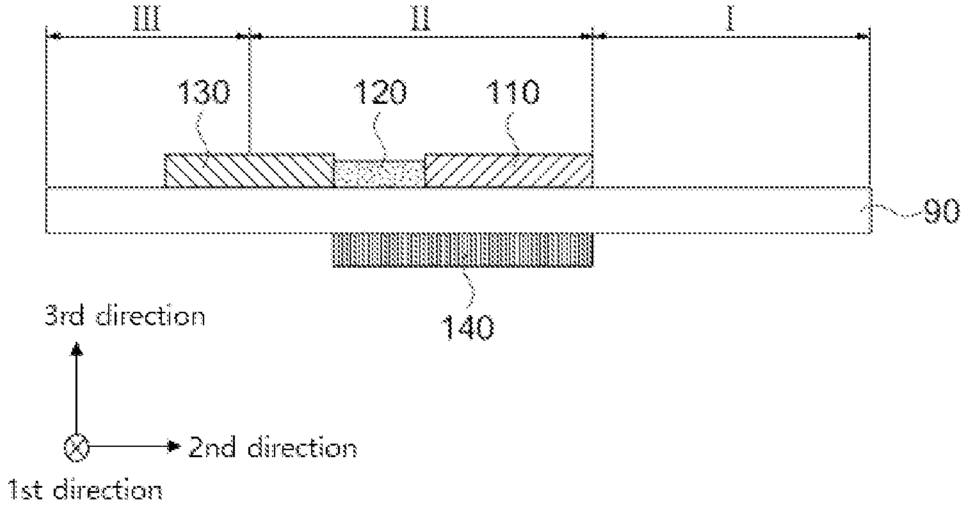
FIG. 8 is a cross-sectional view illustrating an antenna device in a planar state before being bent in accordance with some exemplary embodiments.

FIG. 7 is a cross-sectional view illustrating an antenna device in accordance with some exemplary embodiments. FIG. 8 is a cross-sectional view illustrating an antenna device in a planar state before being bent in accordance with some exemplary embodiments. Detailed description of elements and structures substantially the same as or similar to those described with reference to FIGS. 1 to 6 are omitted herein.

Referring to FIG. 7, the antenna device according to some exemplary embodiments may include the dielectric layer 100, the radiator 110 and the transmission line 120 disposed on the second surface 100*b* of the dielectric layer, and the signal pad 130 disposed over the second surface 100*b* and the third surface 100*c* of the dielectric layer.

The transmission line 120 may be formed only on the second surface 100*b* of the dielectric layer, so that a length of the transmission line 120 may be shortened and the signal loss through the transmission line 120 may be suppressed.

Referring to FIG. 8, the antenna unit may be formed on the upper surface of the preliminary dielectric layer 90, and the ground pattern 140 may be formed on the lower surface of the preliminary dielectric layer 90.

For example, the radiator 110 and the transmission line 120 may formed on a portion of the upper surface in the second region II of the preliminary dielectric layer 90, and the signal pad 130 may be formed on portions of the upper surface over the second region II and the third region III of the preliminary dielectric layer 90. The ground pattern 140 may be formed on a portion of the lower surface in the second region II of the preliminary dielectric layer 90.

The preliminary dielectric layer 90 on which the antenna unit and the ground pattern 140 are formed may be bent using the second region II so that the ground pattern 140 may be disposed at an inside the dielectric layer 100. In an embodiment, as illustrated in FIG. 7, the ground pattern 140 may be substantially buried in the dielectric layer 100.

Figure 9:
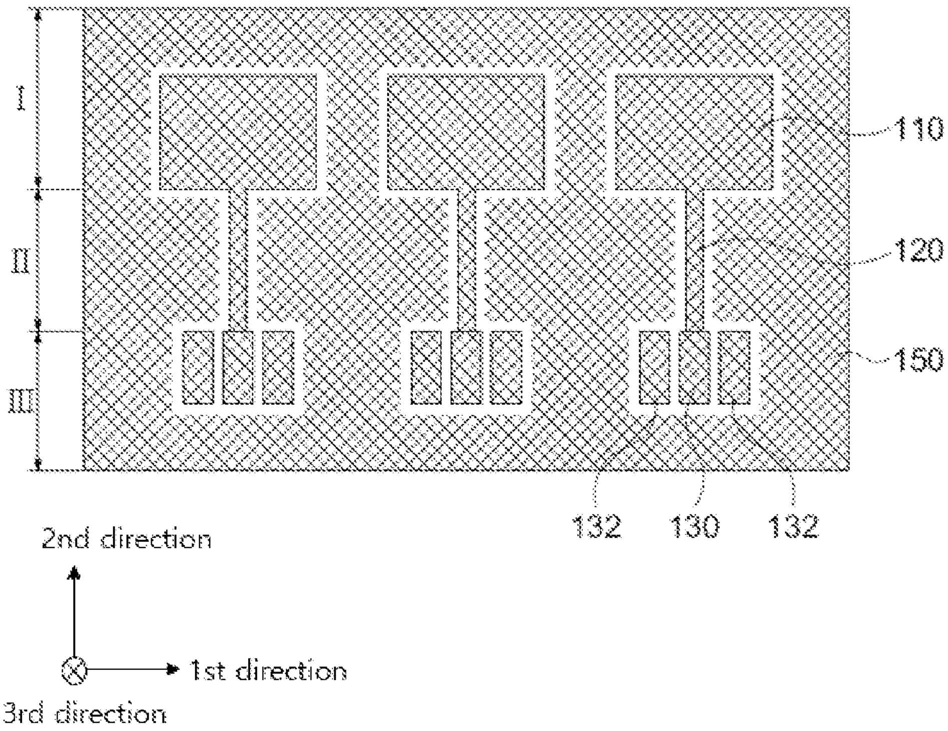
FIG. 9 is a cross-sectional view illustrating an antenna device in a planar state before being bent in accordance with some exemplary embodiments.

FIG. 9 is a cross-sectional view illustrating an antenna device in a planar state before being bent in accordance with some exemplary embodiments.

Referring to FIG. 9, the antenna device may include the antenna unit and a dummy mesh pattern 150 around the antenna unit to be spaced apart from the antenna unit.

The antenna unit may include a mesh structure. In exemplary embodiments, the radiator 110 and the transmission line 120 may include the mesh structure. Accordingly, transmittance of the antenna unit may be increased and flexibility of the antenna device may be improved.

In some embodiments, the radiator 110 may include the mesh structure and the transmission line 120 may include a solid metal structure. In this case, the transmission line 120 may be located at a lateral surface of the dielectric layer (the second surface 100*b*), and the transmission line 120 may not be recognized by a user. Accordingly, a feeding resistance may be reduced and the signal loss through the transmission line 120 may be prevented.

In some embodiments, while employing the mesh structure, electrode lines included in the mesh structure may be formed of a low-resistance metal such as copper, silver, an APC alloy or a CuCa alloy, thereby suppressing a resistance increase. Thus, a low-resistance and high-sensitivity transparent antenna device may be effectively implemented.

The dummy mesh pattern 150 and the antenna unit may include a mesh structure having substantially the same shape. Accordingly, the electrode arrangement around the antenna unit may become uniform so that the mesh structure or the electrode lines included in the antenna unit may be prevented from being recognized by a user of the display device to which the antenna device is applied.

Figure 10:
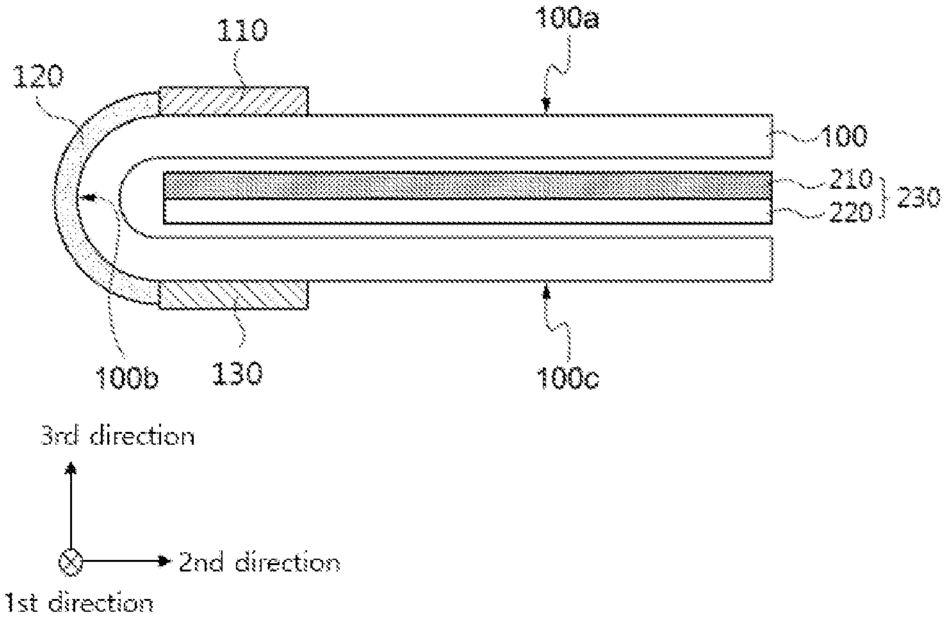
FIG. 10 is a cross-sectional view illustrating a display device in which an antenna device is disposed in accordance with some exemplary embodiments.

FIG. 10 is a cross-sectional view illustrating a display device in which an antenna device is disposed in accordance with some exemplary embodiments. Detailed descriptions of structures and elements substantially the same as or similar to those described with reference to FIGS. 1 to 9 are omitted herein.

Referring to FIG. 10, the antenna device may be disposed on a display panel 230. For example, the display panel 230 may include a flat or curved LCD panel and OLED panel, and the antenna device may be formed in a curved shape along a side surface of the display panel 230.

In exemplary embodiments, the antenna unit may be formed on the preliminary dielectric layer 90, and then the antenna device may be folded using the second region II of the preliminary dielectric layer 90 along a lateral portion of the display panel 230 such that the first region I and the third region III of the preliminary dielectric layer 90 may face each other.

For example, the display panel 230 and the preliminary dielectric layer 90 may be bonded to each other through an adhesive layer, and the adhesive layer may include an insulating material having a dielectric constant.

The display panel 230 may provide a ground layer of the antenna unit. For example, the display panel 230 may include an electrode layer 210 formed on a panel substrate 220, and a conductive member of the electrode layer 210 may serve as the ground layer of the antenna unit.

In exemplary embodiments, the first region I of the dielectric layer 100 may be disposed on the electrode layer 210 included in the display panel 230, and the electrode layer 210 may serve as the ground layer of the antenna unit.

The second region II of the dielectric layer 100 may be folded along the side surface of the display panel 230. Accordingly, a curved OLED may be used as the display panel 230 so that the conductive member of the display panel 230 may be used as the ground layer of the radiator 110 without an additional ground layer.

In exemplary embodiments, the third region III of the dielectric layer 100 may be disposed under the display panel 230.

Figure 11:
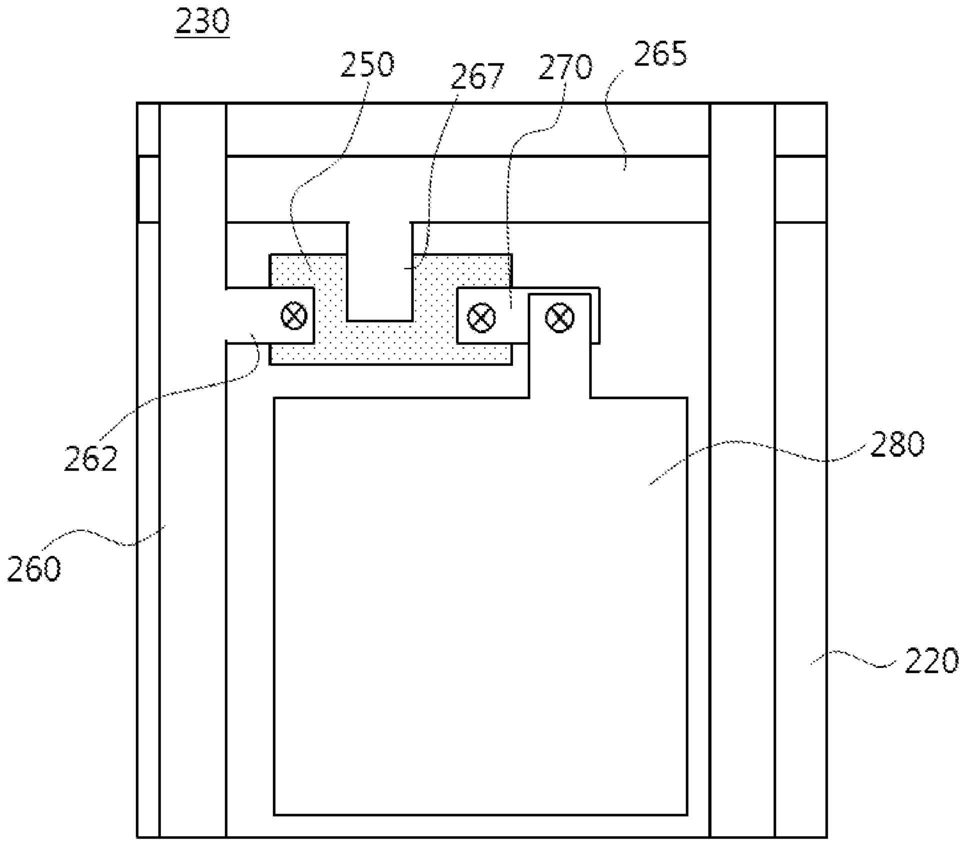
FIGS. 11 and 12 are schematic top planar views illustrating a display device in accordance with exemplary embodiments.
Figure 12:
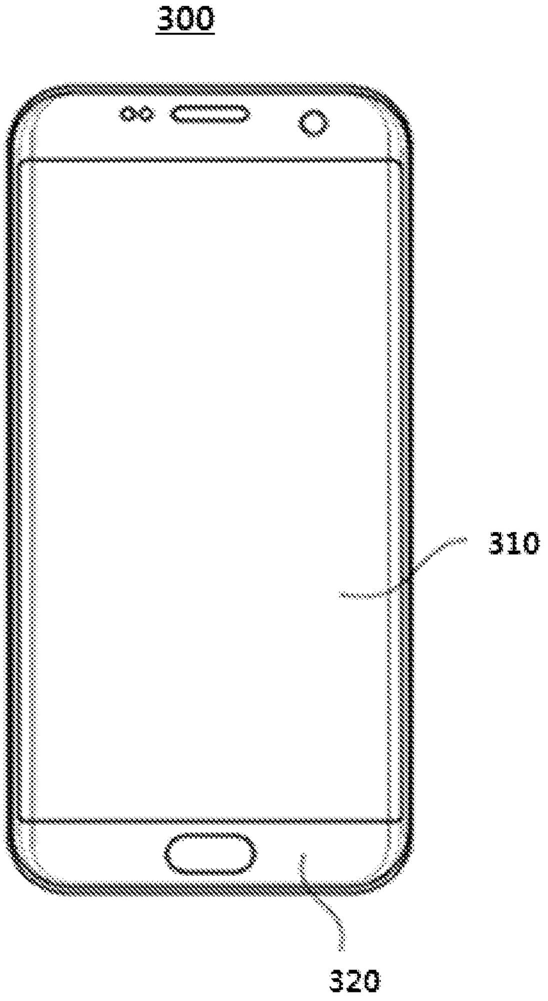

FIGS. 11 and 12 are schematic top planar views illustrating a display device in accordance with exemplary embodiments. For example, FIG. 11 is a schematic top planar view for describing an electrode structure included in a display panel. FIG. 12 illustrates an outer shape including a window of a display device.

Referring to FIG. 11, the display device may include the antenna device formed on the display panel 230, and the display panel 230 may include the panel substrate 220 and the electrode layer 210. For example, the display panel 230 may be a display panel such as an LCD panel or an OLED panel.

The electrode layer 210 may include a pixel structure including a thin film transistor (TFT), a wiring structure and an electrode structure. For example, the TFT including an active layer 250, various wiring structures such as a scan line 265 and a data line 260, the electrode structure such as a source electrode 262, a gate electrode 267, a drain electrode 270 and a pixel electrode 280, etc., included in the display panel 230 may be a conductive member of the display panel 230. Accordingly, the conductive member included in the display panel 230 may serve as the ground layer without the formation of an additional ground layer under the radiator 110 of the antenna device.

Referring to FIG. 12, a display device 300 may include a display area 310 and a peripheral area 320. The peripheral area 320 may be located at both sides and/or both ends of the display area 310.

The peripheral area 320 may correspond to, e.g., a light-shielding portion or a bezel portion of the image display device. The integrated circuit (IC) chip for controlling driving/radiation properties of the antenna device and supplying a feeding signal may be disposed in the peripheral region 320.

The antenna device according to the above-described exemplary embodiments may be inserted into the peripheral region 320 in the form of, e.g., an antenna film or an antenna patch. The antenna device may be three-dimensionally disposed using the second surface 100*b* or the second region II as described above, so that an area or a volume of the peripheral region 320 may be reduced, and a size of the display area 310 from which an image is displayed may be relatively increased.

In an embodiment, the antenna device may be located at least partially in the display area 310. In this case, as described with reference to FIG. 9, the antenna unit may include the mesh structure, and an image quality may be prevented from being degraded by the antenna unit.

What is claimed is:

1. An antenna device comprising:

a dielectric layer; and an antenna unit disposed on at least two of an upper surface, a side surface and a lower surface of the dielectric layer to have a bent structure, wherein the antenna unit comprises a radiator, a transmission line branched from and integrally connected to the radiator, and a signal pad directly connected to an end portion of the transmission line, wherein the dielectric layer is formed by folding a preliminary dielectric layer in a planar state which comprises a first region, a second region and a third region, and the second region is folded so that the first region and the third region face each other, and a surface of the second region of the preliminary dielectric layer corresponds to the side surface of the dielectric layer.

2. The antenna device of claim 1, wherein the side surface of the dielectric layer has a curved surface.

3. The antenna device of claim 1, wherein the radiator has a mesh structure.

4. The antenna device of claim 1, wherein the radiator is disposed on the upper surface of the dielectric layer, the transmission line is disposed on the side surface of the dielectric layer, and the signal pad is disposed on the lower surface of the dielectric layer.

5. The antenna device of claim 1, wherein the radiator and the transmission line are disposed on the upper surface of the dielectric layer, and the signal pad is disposed on the side surface and the lower surface of the dielectric layer.

6. The antenna device of claim 1, wherein the radiator and the transmission line are disposed on the side surface of the dielectric layer.

7. The antenna device of claim 6, further comprising a ground pattern disposed at an inside of the dielectric layer to face the radiator with the dielectric layer therebetween.

8. The antenna device of claim 6, wherein the signal pad is disposed on the lower surface of the dielectric layer.

9. The antenna device of claim 6, wherein a portion of the signal pad is disposed on the side surface of the dielectric layer, and a remaining portion of the signal pad is disposed on the lower surface of the dielectric layer.

10. The antenna device of claim 1, further comprising a ground pad spaced apart from the transmission and disposed around the signal pad.

11. A display device comprising the antenna device according to claim 1.

12. An antenna device, comprising:

a dielectric layer; and an antenna unit disposed on at least two of an upper surface, a side surface and a lower surface of the dielectric layer to have a bent structure, wherein the dielectric layer is formed by folding a preliminary dielectric layer in a planar state which comprises a first region, a second region and a third region, and the second region is folded so that the first region and the third region face each other, and a surface of the second region of the preliminary dielectric layer corresponds to the side surface of the dielectric layer.

13. The antenna device of claim 12, wherein the first region of the dielectric layer is disposed on an electrode structure included in a display panel, and the electrode structure serves as a ground layer of the antenna unit.

14. The antenna device of claim 13, wherein the second region of the dielectric layer is folded along a side surface of the display panel.

15. The antenna device of claim 14, wherein the third region of the dielectric layer is disposed under the display panel.

16. The antenna device of claim 12, wherein the antenna unit comprises a radiator having a mesh structure.

17. The antenna device of claim 16, further comprising a dummy mesh pattern arranged around the radiator and spaced apart from the radiator.

* * * * *